May 24, 1932.   A. CONTI   1,860,308
WHEEL RIM
Filed July 2, 1927
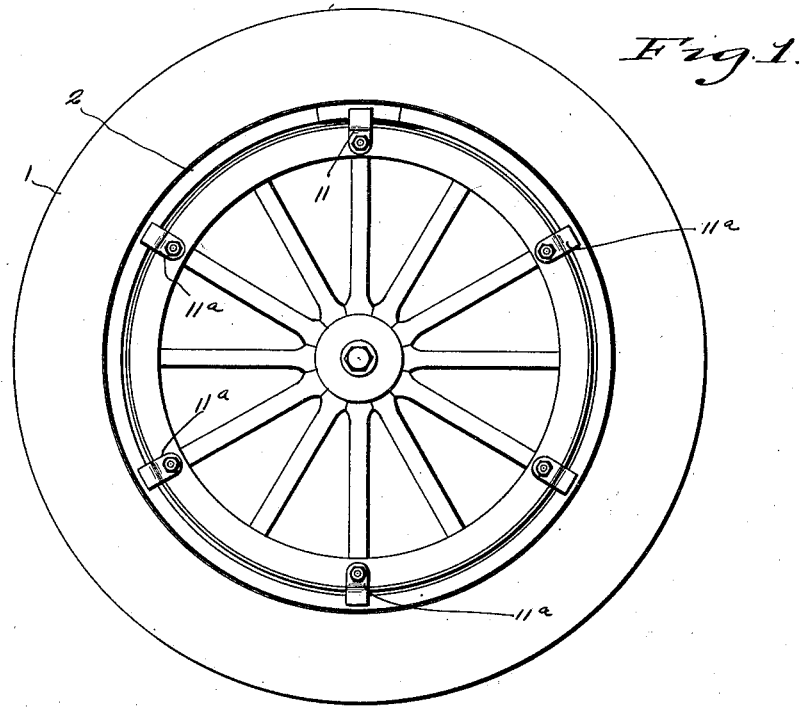
Fig.1.
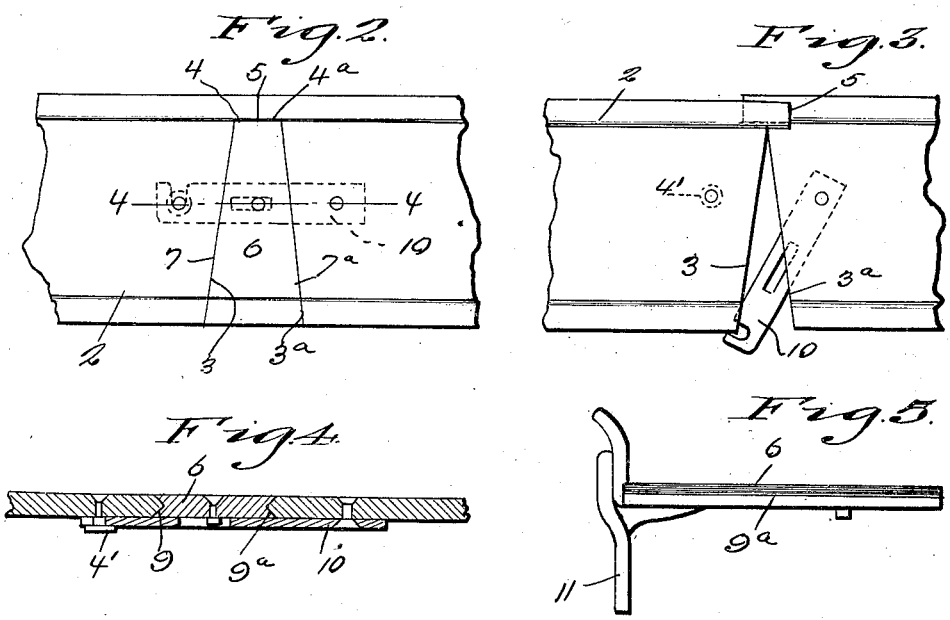
Adam Conti INVENTOR
BY Victor J. Evans
ATTORNEY
WITNESS:

Patented May 24, 1932

1,860,308

UNITED STATES PATENT OFFICE

ADAM CONTI, OF AKRON, OHIO

WHEEL RIM

Application filed July 2, 1927. Serial No. 203,111.

This invention relates to an improved expanding ring for a demountable pneumatic tire, the object being to facilitate the replacing of an inflated tire and its shoe on the tire carrying rim of a vehicle, such as an automobile. The object is to simplify the replacement of a deflated tire by a spare one.

In carrying out the invention I provide the usual form of split rim in which the inflated shoe is carried, with tapered edges at the split portion of the rim both across and parallel with the axis of rotation, the transverse taper being gradual as of a gentle wedge shape up to a point near the opposite edge where the rim forms an obtuse angular bend adapted when the rim is expanded to be put by the pneumatic tire under compression to form a snug fit with the meeting edges. An auxiliary feature of the invention is a pivoted latch pivotally connected with one of the split rim edges with an intermediate longitudinal slot to span a pin or boss on a wedge engaging the tapered rim edges in dove-tail grooves, and the free end of the latch having a slot to nest around a boss or pin on the other end of the rim.

The invention therefore comprises a demountable transversely split rim having its ends transversely disposed to receive a dove-tail wedge, and being adapted for expansion by said wedge within an uninflated pneumatic tire and when the tire is inflated, for replacement on a wheel, said rim having its split of a conformation to lock with the wedge, thereby facilitating mounting and demounting. It comprises other features consisting of a pivoted latch which acts as an auxiliary lock when the rim is expanded and which maintains the tire in proper condition when carried as a spare. It comprises other more specific features, the novelty of which will be more fully hereinafter described and will be definitely indicated in the appended claim.

In the accompanying drawings illustrating the invention:

Figure 1 is a face view of an expanded rim provided with my improvements as mounted on a wheel.

Figure 2 is a detailed view in plan of a portion of the rim showing the wedge shape by which the expansion is effected.

Figure 3 is a similar view to that of Figure 2 showing the auxiliary latch open.

Figure 4 is a detail sectional view across the plane of the wedge and auxiliary latch.

Figure 5 is a detail view of the wedge and a lug holding it in place.

Referring now in detail to the drawings, 1 represents an inflated pneumatic tire, the inner tube of which is filled with compressed air and the outer shoe 1 is of a thick molded vulcanized product adapted to be sprung over a split steel ring 2 usually of channel form with side flanges to retain the tire in place. In carrying out my improvements I provide sloping end walls at the split, as indicated at 3, 3a, the taper on each end wall forming an obtuse angle with the sides 4 and 4a, with straight walls 5 forming the meeting edges. Thus when the rim is in fully expanded position the edges at 5 and at 3, 3a form a continuous broken line intercepted by a wedge 6. The longitudinal edges of the wedge are tapered as indicated at 7, 7a in Figure 2 and the key wedge 6 which slopes coincidently with the edges 3, 3a carries angular grooves 9, 9a which form a dove-tail fit with the tapered edges of the split, which will be clearly apparent from Figure 4. In mounting a tire, the rim is contracted as usual and a deflated tire is placed over it and the edges of the split brought into proximity, as seen in Figure 3, and the wedge 6 applied to the latch 10 with the wedge pin in the slot and the wedge is driven in, thereby expanding the rim edges to position of Figure 2, and the latch locks on the pin 4', thus completing the mounting. The tire is then pumped up and can be used as a spare or mounted on the wheel by application of the lugs in the usual way, and the lugs are applied thereby completing the operation.

I provide an auxiliary latch 10 which prevents any possible displacement, especially while the mounted tire is carried as a spare. In mounting the rim of the felly the radial lugs 11 and 11a, of which there are usually a plurality distributed uniformly along the periphery of the wheel, are removed from the bolts carried by the felly and when replaced lock the rim in place. In replacing a new tire in place of a deflated one, an uninflated spare is slipped on the demountable rim of the wheel until proper alignment of the tire is effected. When the wedge is fully seated in place the edges 4, 4a of the flange will coincide and spring into place locking with one another. During the time that the wedge is being driven to its seat the pivoted latch 10 is carried by the pin of the wedge extending through the slot to such a position that the slotted end of the latch locks over the pin 4'. The lug 11 is perforated in a similar manner to the lugs 11a, passes over a stud bolt carried by the felly and clamps against the wedge 6. This as well as the co-operating lugs 11a, etc., are replaced and the nuts screwed home, thereby locking the wedge in position. If the tire should become deflated for any reason and a new spare is required it is but a matter of a few moments' delay to put on a new tire, in doing which the lugs 11, 11a, etc., are taken off and an uninflated tire slipped on, when the latch 10 may be pushed by the wedge into place and latched, permitting the tire to be maintained in an inflated condition while being carried as a spare.

Having thus described my invention, what I claim as new and desire to secure by Letters Patent is:

A rim of the character described comprising an externally channeled annulus transversely split to present confronting reversely beveled ends to effect a substantially V-shaped gap therebetween extending through one side flange of the annulus, but terminating at the inner wall of the opposite side flange, said latter flange at the transverse split having its ends extended slightly beyond the beveled confronting ends and adapted to abut each other to maintain said beveled ends relatively wide apart, said beveled ends having tapered edges of V-shape throughout their extent, a wedge conforming to the gap between the beveled ends to be received therein for abutting said extensions and having channels in opposite edges to seat the tapered portions of said end edges, and a latch pivoted to one beveled end and having a slidable connection with the wedge and also detachably engageable with the other beveled end for retaining the wedge in the gap and the latter united with the beveled ends.

In testimony whereof I affix my signature.

ADAM CONTI.